United States Patent
Sato

(10) Patent No.: US 8,300,336 B2
(45) Date of Patent: Oct. 30, 2012

(54) MAGNETIC TRANSFER DEVICE

(75) Inventor: Narumi Sato, Nagano (JP)

(73) Assignee: Fuji Electric Co., Ltd. (JP)

( * ) Notice: Subject to any disclaimer, the term of this patent is extended or adjusted under 35 U.S.C. 154(b) by 562 days.

(21) Appl. No.: 12/603,281

(22) Filed: Oct. 21, 2009

(65) Prior Publication Data

US 2010/0103550 A1 Apr. 29, 2010

(30) Foreign Application Priority Data

Oct. 21, 2008 (JP) .................................. 2008-271017

(51) Int. Cl.
*G11B 5/86* (2006.01)
(52) U.S. Cl. .......................................................... 360/16
(58) Field of Classification Search ............... 360/97.01, 360/97.02, 97.03, 97.04, 16
See application file for complete search history.

(56) References Cited

U.S. PATENT DOCUMENTS

2011/0304973 A1* 12/2011 Farahani et al. ......... 361/679.33
2012/0033318 A1*  2/2012 Boutaghou et al. ............. 360/31

FOREIGN PATENT DOCUMENTS

| JP | 2002-092871 A | 3/2002 |
|----|---------------|--------|
| JP | 2002-183948 A | 6/2002 |
| JP | 2003-085936 A | 3/2003 |
| JP | 2003-272138 A | 9/2003 |
| JP | 2004-310809 A | 11/2004 |
| JP | 2005-063579 A | 3/2005 |
| JP | 2005-169302 A | 6/2005 |

* cited by examiner

*Primary Examiner* — Allen Cao
(74) *Attorney, Agent, or Firm* — Rossi, Kimms & McDowell LLP

(57) ABSTRACT

A magnetic transfer device enables precise positioning of both disks while preventing generation of dust by sliding of a holder, and also secures a space for transfer magnet arrangement. A master disk on which is formed a magnetic signal pattern and a magnetic disk which is to receive transfer are accommodated and brought into close contact in opposition to each other within an interior space formed by a male-side holder which moves to approach and withdraw and a female-side holder. A plurality of positioning pins are brought into contact with the outer face of the male-side holder to position the male-side holder, and by installing the positioning pins at positions lower than both the master disk and the magnetic disk, dust generated by sliding of the positioning pins does not fall onto the face of the master disk or the magnetic disk.

9 Claims, 6 Drawing Sheets

MAGNETIC TRANSFER DEVICE

BACKGROUND OF THE INVENTION

The invention relates to a magnetic transfer device, which uses magnetic transfer technology to write specific data or servo signals for magnetic head positioning for writing and reading of data written in the magnetic disk surface of a hard disk drive (hereafter "HDD").

At present, magnetic disks are shipped in a state in which no information is magnetically written, and after installation in a HDD device, the necessary magnetic information is written within the HDD. In the HDD, magnetic disks are magnetically divided into concentric regions having a fixed width, called tracks, and data reading and writing is performed while causing the magnetic head to follow over these tracks. The HDD detects positional deviations of the head through magnetic signals, called servo signals, which are written on the tracks, and the head is controlled so as not to deviate from a track.

However, in order to precisely write servo signals in a concentric shape in a magnetic disk onto which nothing has been written, a device having a precise position control function is necessary; and because a mechanism requiring precise positioning is inserted into an HDD from outside, this task must be performed within a cleanroom in order to prevent intrusion of dust into the HDD. Also, several hours are required to write servo signals to tracks, which number in the hundreds of thousands on a single surface, while performing precise positioning. As stated above, this task of writing servo signals must be performed in a cleanroom for each HDD, and a high-precision device is used, resulting in increases in HDD manufacturing costs.

Technology and a device have been developed in which, by bringing into close contact with the magnetic disk a special disk for magnetic transfer called a master disk, having the above-described servo signal pattern, and applying a magnetic field from outside, the servo signal pattern is instantaneously transferred to the magnetic disk. By this means, drive manufacturing costs can be reduced, and track densities can be increased (track widths can be reduced). However, magnetic transfer is performed with the master disk brought into close contact with the magnetic disk, so that particles trapped between the two present a major problem. Trapped particles worsen the close contact between the master disk and magnetic disk and worsen the quality of transferred signals; moreover, there is the possibility of damage to the signal pattern of the master disk, and if a master disk which has once been damaged continues to be used, media with degraded transferred signal quality continue to be manufactured.

In light of the above problem, for example in Japanese Patent Laid-open No. 2005-63579, a method is disclosed in which air is blown onto and simultaneously suctioned from the surfaces of both disks before being brought into close contact; in Japanese Patent Laid-open No. 2005-169302 and in Japanese Patent Laid-open No. 2003-85936, methods are disclosed in which the surface of a master disk is cleaned using dry ice or plasma etching; and, in Japanese Patent Laid-open No. 2002-92871, a method is proposed in which a master disk is subjected to periodic ultrasonic cleaning.

On the other hand, there are very few magnetic transfer devices the transfer mechanism portion of which features prevention of the occurrence of particles while satisfying requirements for transfer performance. In a transfer mechanism portion, two holders, which grasp the master disk and a magnetic disk, are moved into and out of contact, and during transfer the two disks are placed in a space in which airtightness is maintained. Hence in order to maintain airtightness the two holders having sliding portions, and during sliding thereof, dust generation poses a problem.

In Japanese Patent Laid-open No. 2004-310809, a transfer holder of a magnetic transfer device is disclosed, which is characterized in not having a sliding portion in the above-described space in which airtightness is maintained. However, due to an elastic structure for the outer periphery of the holder, pressure is applied to the holder center portion when the master disk and magnetic disk are brought into close contact, and there is no longer space for arrangement of and rotation of a transfer magnet. Further, due to elastic deformation when pressure is applied, the precision of positioning between the disks is reduced, so that servo signals may be transferred with eccentricity, or in other ways transfer performance is necessarily sacrificed. In Japanese Patent Laid-open No. 2002-183948, a method is disclosed of bringing a plurality of positioning pins into contact with a slave holder and performing positioning, and in Japanese Patent Laid-open No. 2003-272138, a method is disclosed in which, in order to resolve the problem of adhesion of dust to surfaces in close contact, a suction passage for suction of dust is opened, and dust occurring at the time of insertion and removal of the center pin into and from the slave media and at other times is suctioned away and removed.

SUMMARY OF THE INVENTION

The invention provides a magnetic transfer device which enables precise positioning of both disks while preventing the occurrence of dust due to holder sliding, and also secures a space for transfer magnet arrangement.

In order to resolve the above problems, in a magnetic transfer device of this invention, a holder positioning mechanism and airtightness maintenance mechanism are provided at positions lower than the disks, without sliding of the two holders. The mechanisms are operated after the master disk and magnetic disk are covered by both holders, so that even if there is dust generation from a mechanism portion, there is no trapping of particles between the disks. Further, by providing a suction opening, necessary for close contact, close to a mechanism portion, suctioning of dust in the interior space and suctioning for close contact can be performed simultaneously.

A mechanism for applying pressure to holders during the bringing into close contact employs a method of applying pressure to the holder outer periphery. By this means, the space necessary for transfer magnet operation can be secured above the master disk.

According to the invention, by preventing generation of dust through holder sliding, the trapping of particles between the master disk and the magnetic disk is prevented. Further, precise positioning of the two disks is made possible, and by securing space for transfer magnet arrangement, a magnetic transfer device with high productivity can be provided.

Other features, advantages, modifications and embodiments of the invention will become apparent from those skilled in the art from the following detailed description of the preferred embodiments thereof.

BRIEF DESCRIPTION OF THE DRAWINGS

The invention will be described with reference to certain preferred embodiments thereof and the accompanying drawings, wherein.

DESCRIPTION OF THE PREFERRED EMBODIMENTS

Figure 1:
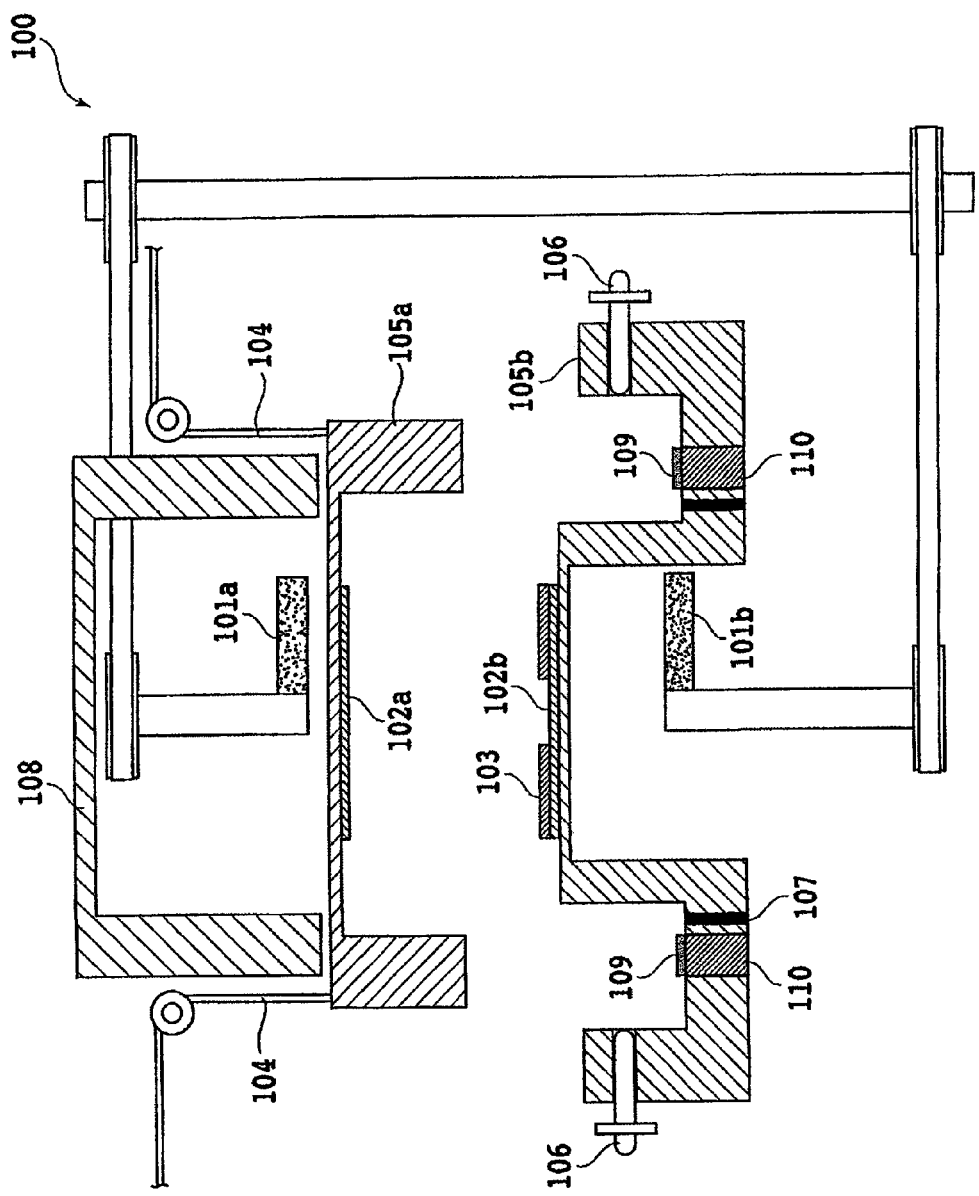
FIG. 1 is a configuration diagram showing the state prior to transfer of the magnetic transfer device of an aspect of the invention.

FIG. 1 is a configuration diagram showing the state prior to transfer 100 of the magnetic transfer device of an aspect of the invention. In FIG. 1, the magnetic transfer device 100 comprises transfer magnets 101a, 101b; master disks 102a, 102b; a magnetic disk 103; wires 104; an upper holder 105a; a lower holder 105b; positioning pins 106; suction openings 107; a pressurizing ring 108; an elastic member 109; and a shutter ring 110. In the state prior to transfer shown in FIG. 1, the master disks 102a, 102b are gripped by the magnetic transfer mechanism portion, and the magnetic disk 103 prior to transfer is set by a conveyor system, not shown.

Figure 2:
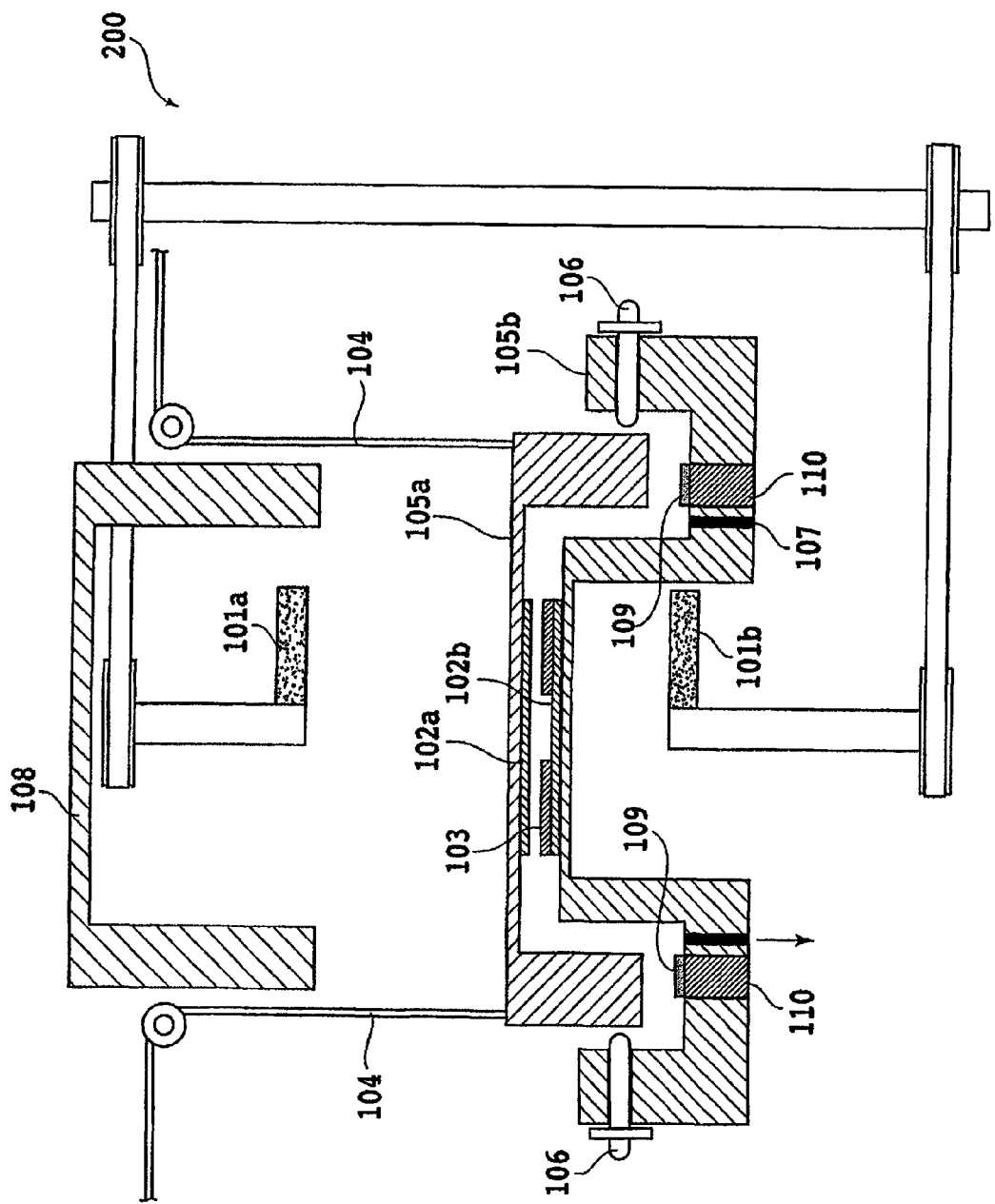
FIG. 2 is a configuration diagram showing the state immediately prior to disk contact of the magnetic transfer device of an aspect of the invention.

FIG. 2 is a configuration diagram showing the state immediately prior to disk contact 200 of the magnetic transfer device of the aspect of the invention. In FIG. 2, the upper holder 105a is lowered by feeding wires 104 from a wire takeup portion, not shown, to approach the lower holder 105b. At this time, the upper holder 105a is stopped at a position at which the master disk 102a, gripped by the upper holder 105a, is not quite in contact with the magnetic disk 103. The upper holder 105a is suspended and has a degree of freedom; but by gradually causing each of the plurality of arranged positioning pins 106 to protrude, positioning is performed such that the master disk 102a and magnetic disk 103 approach the desired positions. The movement amounts of each of the positioning pins 106 may be fixed amounts set in advance, or may be adjusted by feedback control so as to approach prescribed positions by having a sensor, not shown, detect the positional relationship of the holders 105a and 105b.

The positioning pins 106 are provided at positions lower than the heights of the master disks 102 and magnetic disk 103, so that dust generated by pin movement does not fall onto the master disks 102 or magnetic disk 103. The suction openings 107 are connected to a pump, not shown, and begin suction, so that even should dust be generated by sliding of the pins 106, the dust is suctioned away.

Figure 3:
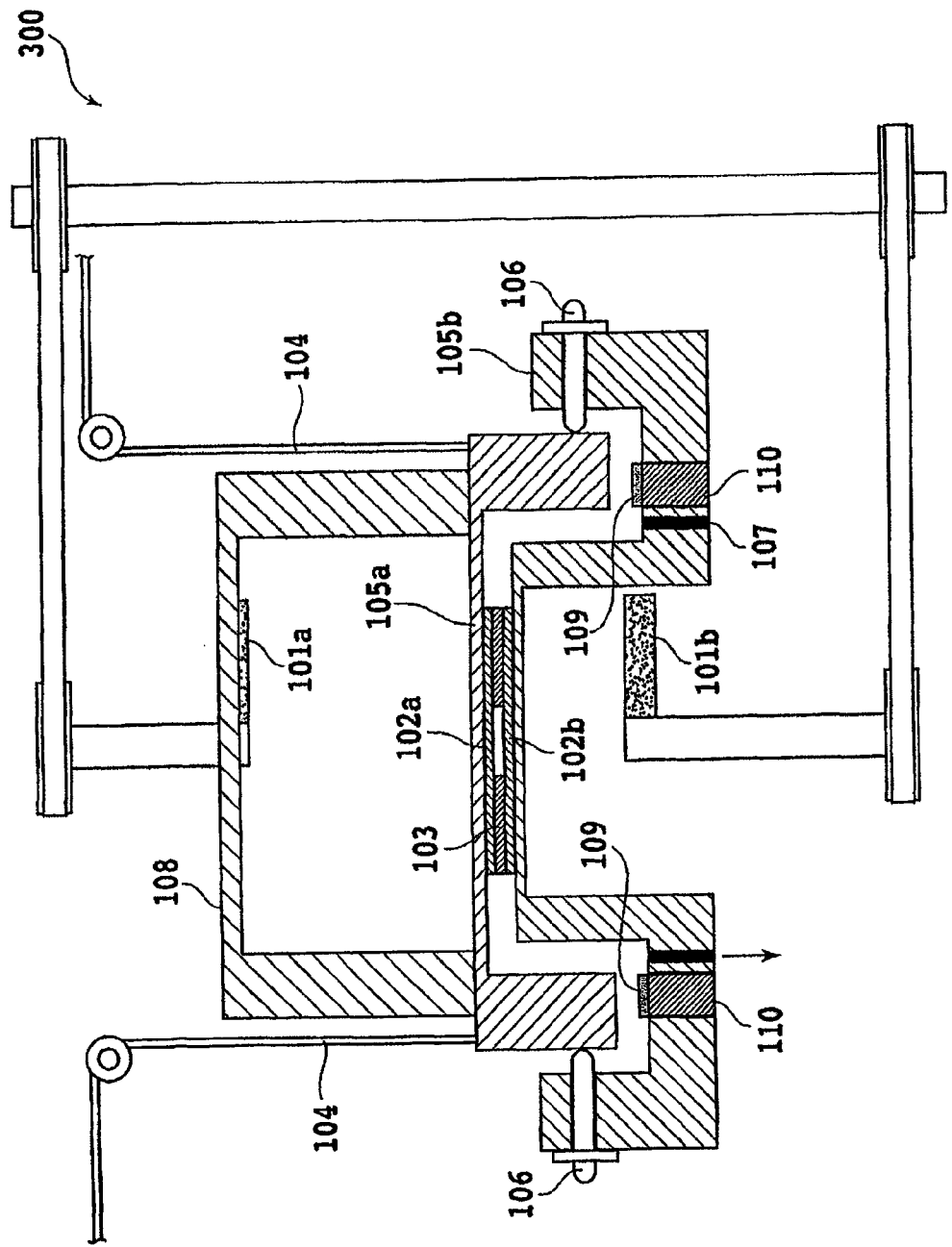
FIG. 3 is a configuration diagram showing the state of causing disk contact of the magnetic transfer device of an aspect of the invention.

Next, FIG. 3 is a configuration diagram showing the state of causing disk contact 300 of the magnetic transfer device of the aspect of the invention. In FIG. 3, the pressurizing ring 108 is brought into contact with the upper holder 105a by means of a mechanism not shown in FIG. 3. At this time, pressurizing has not yet begun. In this way the position of the upper holder 105a is locked by the positioning pins 106 at a certain stage, and the upper holder 105a is completely fixed in place.

Figure 4:
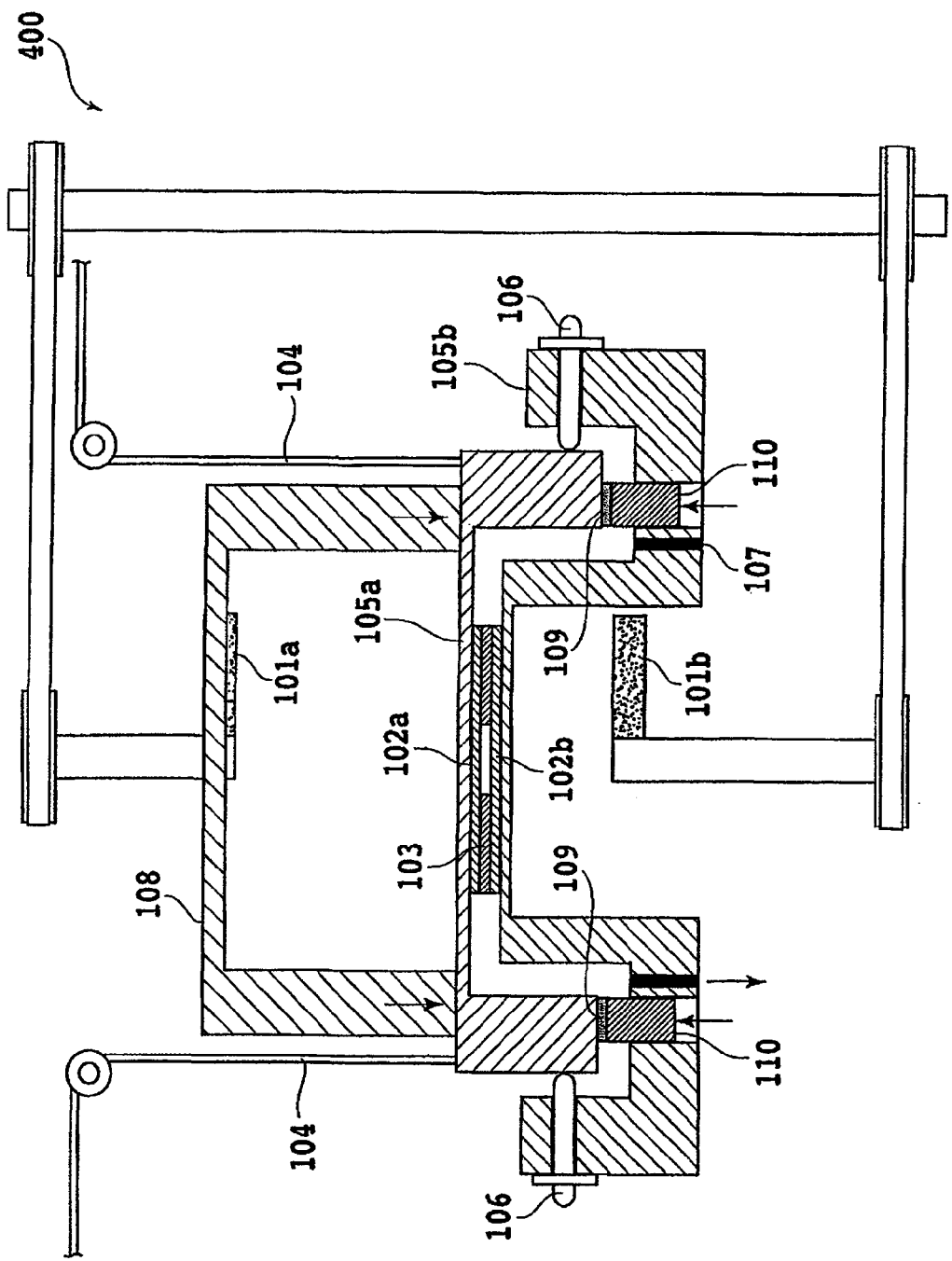
FIG. 4 is a configuration diagram showing the state of causing disk contact and suctioning the interior air of the magnetic transfer device of an aspect of the invention.

FIG. 4 is a configuration diagram showing the state of causing disk contact and suctioning the interior air 400 of the magnetic transfer device of the aspect of the invention. In FIG. 4, a shutter ring 110, on which is installed an elastic member (O-ring or similar) 109 to preserve airtightness, is made to press forward, separating the space in which the master disks 102 and magnetic disk 103 are placed from the outside. Here internal air is suctioned out from the suction openings 107, so that the space in which the master disks 102 and magnetic disk 103 are placed is at negative pressure with respect to the outside, and the master disks 102 and magnetic disk 103 begin close contact. Further, by pressurizing the upper holder 105a by means of the pressurizing ring 108, the master disks 102 and magnetic disk 103 are brought into complete close contact. When the shutter ring 110 is pressed forward, sliding with the lower holder 105b occurs; but even if dust is generated, by suctioning from the suction openings 107, dust is not dispersed within the space.

Figure 5:
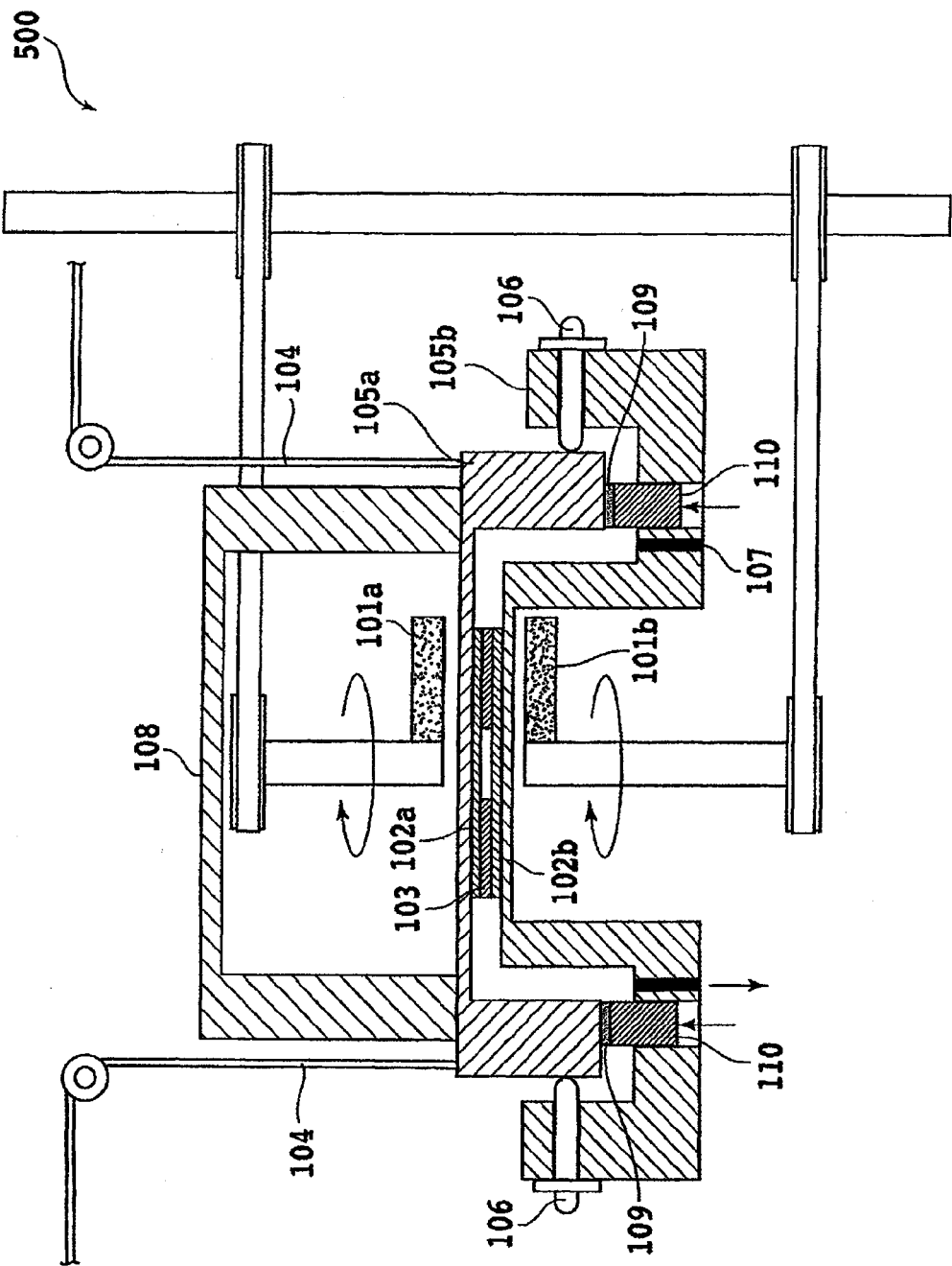
FIG. 5 is a configuration diagram showing the state of transferring to the disk of the magnetic transfer device of an aspect of the invention; and, FIG. 6 is a configuration diagram showing the state after transfer completion of the magnetic transfer device of an aspect of the invention.

FIG. 5 is a configuration diagram showing the state of transferring to the disk 500 of the magnetic transfer device of the aspect of the invention. In FIG. 5, the two transfer magnets 101a and 101b approach while rotating. At this time, the magnets approach while maintaining a state in which the distances between the magnets 101a, 101b and the magnetic disk 103 are equal, and the approach is stopped at the position, set in advance, at which the magnetic field necessary for transfer is obtained. Then, the magnets 101a, 101b are rotated a prescribed number of times, and while continuing rotation, the magnets are withdrawn, while maintaining a state in which the distances between the magnets 101a, 101b and the magnetic disk 103 are equal. In this way, the magnetic information of the master disks 102a, 102b is transferred to both faces of the magnetic disk 103.

Figure 6:
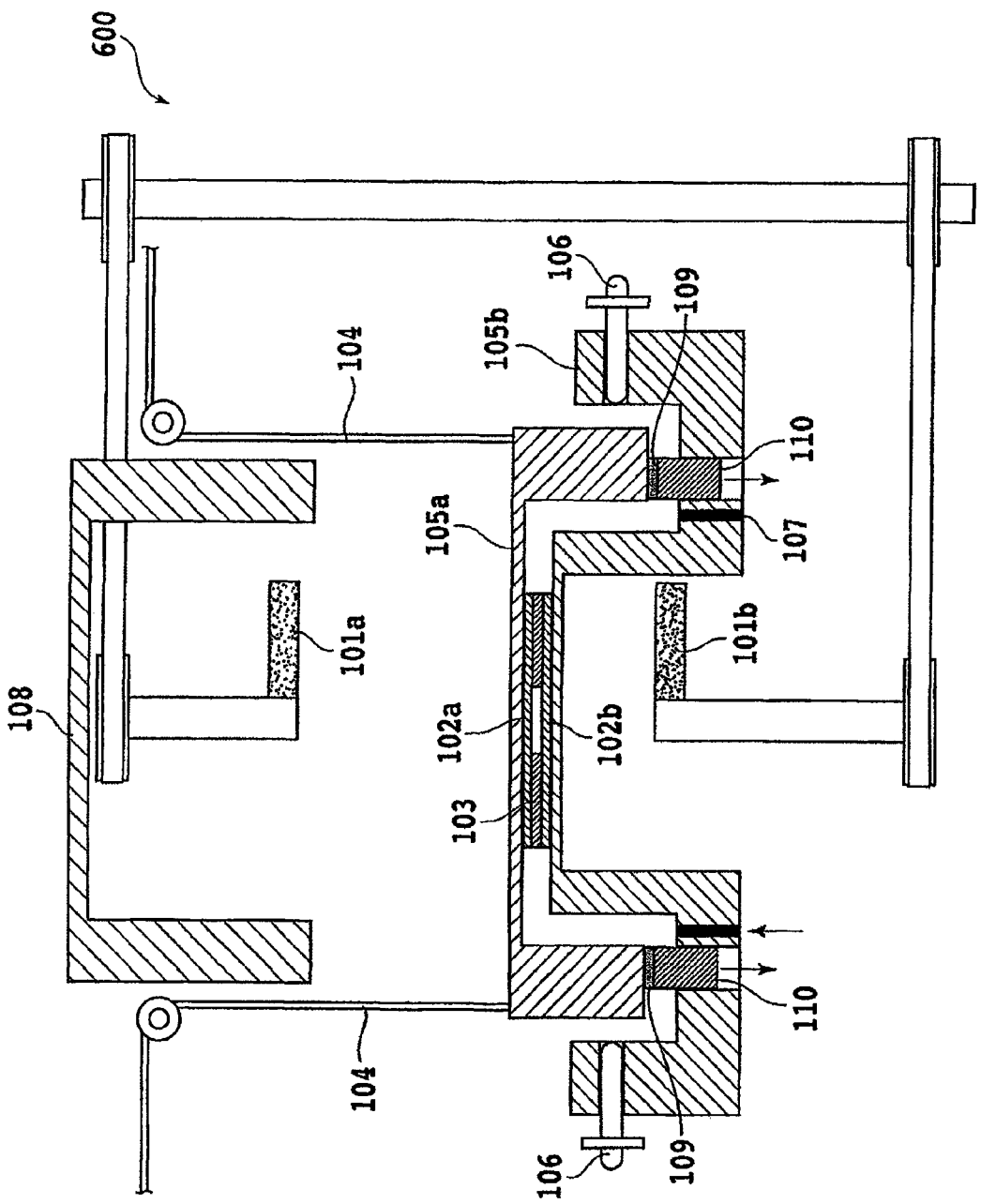

FIG. 6 is a configuration diagram showing the state after transfer completion 600 of the magnetic transfer device of the aspect of the invention. As shown in FIG. 6, after transfer completion, the positioning pins 106 are removed, and the pressurizing ring 108 is raised. The two holders 105a, 105b are unsealed by charging of clean air through the suction openings 107.

The invention has been described with reference to certain preferred embodiments thereof. It will be understood, however, that modifications and variations are possible within the scope of the appended claims.

This application is based on and claim priority to Japanese Patent Application 2008-271017, filed Oct. 21, 2008. The disclosure of the priority application in its entirety, including the drawings, claims and the specification thereof, is incorporated herein by reference.

What is claimed is:

1. A magnetic transfer device, in which a master disk on which is formed a magnetic signal pattern and a magnetic disk which is to receive transfer are accommodated and brought into close contact in opposition to each other within an interior space formed by a male-side holder which moves to approach and withdraw and a female-side holder, wherein in order to perform positioning of the master disk and the magnetic disk before being brought into close contact, a plurality of positioning pins are brought into contact with the outer face of the male-side holder which moves to approach and withdraw to position the male-side holder, and by installing the positioning pins at positions lower than both the master disk and the magnetic disk, dust generated by sliding of the positioning pins does not fall onto the face of the master disk or the magnetic disk.

2. The magnetic transfer disk according to claim 1, wherein the male-side holder is held by a wire, and the position thereof can be freely adjusted by means of the positioning pins during positioning.

3. The magnetic transfer disk according to claim 1, wherein a shutter mechanism portion is further provided on at least one of the two holders in order to seal the interior space.

4. The magnetic transfer disk according to claim 3, wherein a suction opening is further provided in the vicinity of the shutter mechanism portion, by which dust generated by sliding of the shutter is suctioned away, and simultaneously air in the interior space is suctioned to the pressure necessary for close contact.

5. A magnetic transfer device comprising:
   an upper holder and a lower holder moveable respective to each other to form an interior space in which a magnetic disk can be placed, wherein the upper holder and the lower holder are each configured to hold a master disk from which a magnetic signal pattern is to be transferred to a magnetic disk located in the interior space; and
   positioning pins provided at positions lower than the positions at which the master disks are held by the upper holder and the lower holder, wherein the positioning pins act to position the upper holder with respect to the lower holder.

6. The magnetic transfer device according to claim 5, wherein a suction opening is provided in at least one of the upper holder and the lower holder to provide suction to the interior space.

7. The magnetic transfer device according to claim 5, wherein at least one of the upper holder and the lower holder includes a shutter ring.

8. The magnetic transfer device according to claim 5, further comprising a pressurization ring that can be brought into contact with the upper holder.

9. The magnetic transfer device according to claim 5, wherein the upper holder is suspended by feeding wires and is moveable toward the lower holder when lowered by the feeding wires.

\* \* \* \* \*